United States Patent [19]

Pforr et al.

[11] Patent Number: 4,475,749
[45] Date of Patent: Oct. 9, 1984

[54] FLANGE COUPLING

[75] Inventors: Gerhard Pforr, Ludwigshafen; Max Appl, Dannstadt-Schauernheim; Erfried Voelkl, Frankenthal; Hans Stark, Bobenheim-Roxheim; Gerhard Peschau, Frankenthal, all of Fed. Rep. of Germany

[73] Assignee: BASF Aktiengesellschaft, Ludwigshafen, Fed. Rep. of Germany

[21] Appl. No.: 305,911

Foreign Application Priority Data

[30] Oct. 4, 1980 [DE] Fed. Rep. of Germany .. 3037666

[22] Filed: Sep. 25, 1981

[51] Int. Cl.³ .............................................. F16L 59/12
[52] U.S. Cl. ..................................... 285/47; 138/149; 285/156; 285/363; 285/DIG. 12
[58] Field of Search .................. 285/47, DIG. 12, 363, 285/156; 138/149

[56] References Cited

U.S. PATENT DOCUMENTS

| | | | |
|---|---|---|---|
| 2,419,278 | 4/1947 | Motsenbocker, Jr. | 138/149 X |
| 2,423,213 | 7/1947 | Weber | 285/47 |
| 2,464,487 | 3/1949 | Chappell et al. | 285/363 X |
| 3,189,371 | 6/1965 | Swan | 285/DIG. 12 X |
| 3,275,345 | 9/1966 | Waldron et al. | 285/47 |
| 3,491,171 | 1/1970 | French | 138/149 X |
| 3,854,756 | 12/1974 | Couch | 285/47 |
| 4,127,286 | 11/1978 | Albertsen | 285/DIG. 12 X |

FOREIGN PATENT DOCUMENTS

| | | |
|---|---|---|
| 2229699 | 1/1974 | Fed. Rep. of Germany . |
| 2327799 | 1/1975 | Fed. Rep. of Germany . |
| 2706143 | 8/1978 | Fed. Rep. of Germany . |
| 488913 | 7/1938 | United Kingdom ................ 138/149 |

OTHER PUBLICATIONS

Chem. Ing. Technik 43, (1971), pp. 1189–1195.

Primary Examiner—Thomas F. Callaghan
Attorney, Agent, or Firm—Keil & Weinkauf

[57] ABSTRACT

A flange coupling for joining multi-layer apparatus sections or pipeline sections, in which corrosive and hot gases are handled, consists of an inner lining of glass which is resistant to thermal shock, or of quartz, which is surrounded by an outer metal jacket, the interspace between the outer jacket and the lining being packed with a heat-insulating material.

In the region of the ends of the lining, refractory bricks which surround the lining, support it but do not touch it over the entire surface are provided between the lining and the outer jacket; the lining, at one or both ends, does not terminate flush with the refractory bricks, and the refractory bricks surrounding the lining terminate at least substantially flush with the surrounding outer jacket, the two ends of which each merge into a flange coupling.

6 Claims, 4 Drawing Figures

FLANGE COUPLING

In many chemical reactions carried out on an industrial scale, corrosive gases occur in the reactors and in downstream apparatus, as well as in the pipelines through which material is transported; these gases have either been employed as reactants or have been formed during the actual reaction.

For example, the reaction exit gases from the preparation of aluminum chloride by reacting bauxite or alumina with chlorine in the presence of a reducing agent, such as carbon or carbon monoxide inter alia contain—in addition to the desired reaction product aluminum chloride—phosgene and unconverted chlorine, which, especially at the high reaction temperatures of 500° C. or more, have an extremely corrosive effect on the materials which are conventionally used to construct the apparatus for handling these gases, for example for removing dust therefrom.

The good chemical resistance of glass is well known. Since the development of glasses having a low linear coefficient of thermal expansion, ie. exhibiting less thermal expansion and accordingly greater resistance to thermal shock (namely, borosilicate glasses), glass has increasingly gained importance as a material of construction for apparatus and pipelines.

Since glass installations cannot be produced in one piece, a unit construction system has been developed (cf. Chem. Ing. Technik 43, (1971), 1189–1195), which comprises, in a great range of nominal widths, all the components required to build an installation, ranging from pipes and pipe sections to vessels, stirrers, column components, heat exchangers, pumps and other requisite accessories. The individual components of the apparatus are coupled by means of specially constructed glass flanges, which are held together by clamping rings and are made leaktight by means of gaskets, for example made from polytetrafluoroethylene.

The mechanical stability, strength and chemical resistance of borosilicate glasses used in the construction of glass apparatus persist up to the transition temperature of the glass, ie. about 575° C. Nevertheless, the maximum use temperature of glass apparatus and pipelines is about 200° C. Part of the reason for this is that the softening point of the polytetrafluoroethylene employed as the gasket material for the individual components is about 250° C. It would be conceivable to employ gaskets made from a different, more heat-resistant material in place of those made from polytetrafluoroethylene. Such gasket materials are known, an example being asbestos. However, the use of these more heat-resistant gasket materials in constructing glass apparatus presents difficulties in that the bolts of the glass flange couplings have to be tightened more strongly to ensure that these harder gasket materials provide a seal. Since the ability of glass to withstand pressure diminishes with increasing temperature, there are limits on the extent to which bolts can be tightened to achieve a leakproof flange coupling. A further serious problem in the assembly of apparatus and pipes made of glass is the thermal expansion of the materials, which of course increases with temperature.

For these reasons, the use of apparatus and pipelines made of glass is restricted to maximum temperatures of about 200° C.

German Laid-Open Applications DOS No. 2,229,699, DOS No. 2,327,799 and DOS No. 2,706,143 describe glass pipes, armored with steel jackets, in which a resilient packing is provided between the glass tube and the steel jacket. It is true that the resistance of the glass to pressure can be increased by this construction, in that the internal pressures which arise are transmitted via the packing to the more pressure-resistant metal jacket, but what these constructions do not solve is the problem of having a seal, which will not break even at higher temperatures, at the connecting points of two individual sections.

It is an object of the present invention to provide couplings between multi-layer apparatus sections or pipeline sections in which corrosive and hot gases are handled, these couplings consisting of a lining of glass which is resistant to thermal shock, or of quartz, which is surrounded by an outer metal jacket, the interspace between the outer jacket and the lining being packed with a heat-insulating material, which couplings ensure a reliable seal, without danger of fracture of the inner glass or quartz lining, even at elevated temperatures.

We have found that this object is achieved if (a) in the region of the ends of the lining, refractory bricks which surround the lining, support it but do not touch it over the entire surface are provided between the lining and the outer jacket, (b) the lining, at one or both ends, does not terminate flush with the refractory bricks, (c) the refractory bricks surrounding the lining terminate at least substantially flush with the surrounding outer jacket, and (d) the two ends of which each merge into a flange coupling.

The flange couplings according to the invention are explained in more detail with the aid of FIGS. 1 to 4.

Figure 1:
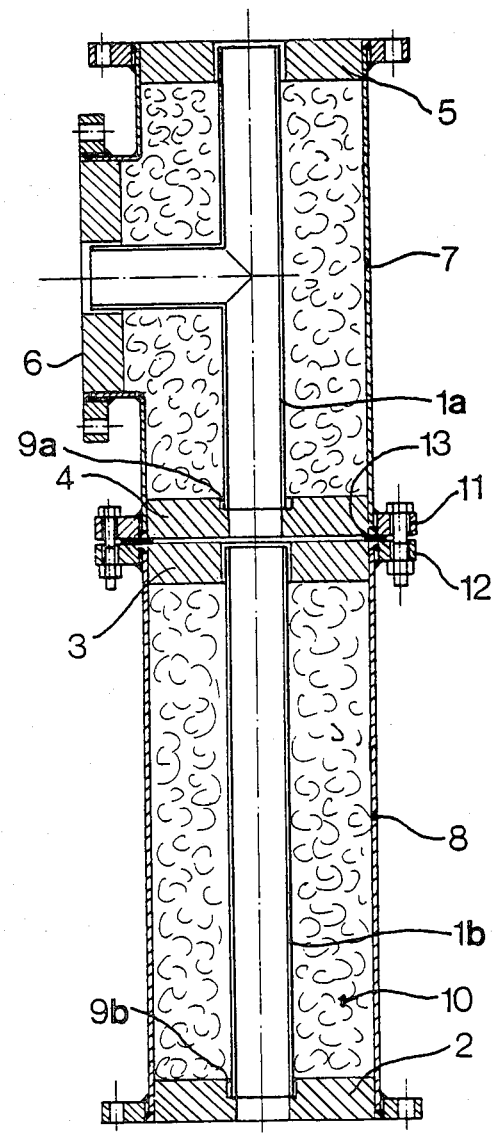
FIG. 1 shows a vertical section through a flange coupling by means of which a length of pipe is coupled to a pipe T-piece.

In FIG. 1, the tubular lining is marked 1b and the T-shaped lining 1a, both being made of glass resistant to thermal shock, or of quartz, the linings being supported in the metal jackets, 7 and 8 respectively, by the refractory bricks 2, 3 and 4, 5, 6 respectively, these bricks being made of, for example, fireclay. The lower tubular lining 1b rests in the recess 9b of the refractory brick 2, whilst the upper refractory brick 3 does not have a recess, but merely a cylindrical orifice, in which the tubular lining 1b terminates, without being flush with the upper end of the brick. The effect of this is that in operation, during which hot gases flow through the interior of the lining 1b, the latter can expand freely in its lengthwise direction. The diameter of the hole in the refractory brick 3 and the diameter of the recess 9b are each somewhat greater than the external diameter of the glass or quartz lining 1b, so that the lining can also expand in the radial direction at elevated temperatures. The dimensions to be chosen in each particular case depend on the coefficients of thermal expansion of the particular materials to be used and of the maximum temperatures to be expected in each specific case. The interspace between the lining and the refractory brick can be stuffed with, for example, quartz wool or glass wool, this stuffing still being sufficiently resilient for it to take up the thermal expansion of the material without the lining cracking as a result of the thermal stresses which arise.

The interspaces between the jacket 8 or 7 and the lining 1a or 1b respectively are packed with a heat-insulating material 10, for example closed-pore foamed glass or quartz or, advantageously, again with glass wool or quartz wool. Of course, a plurality of layers, of different materials, can also be provided in the interspace.

It is in principle conceivable that at a coupling corrosive gas might pass through the glass wool or quartz wool stuffing into the interspace between the lining and the metal jacket, and could corrode the latter. Since, however, reaction gases as a rule contain dust, this possibility can be disregarded in practice, because, within a short time, the dust progressively precipitates in the free spaces of the stuffing and renders the latter impermeable to gas. In the exceptional case of the gas handled in the apparatus being completely free from dust, diffusion of gas into the interspace between the lining and jacket can be prevented by deliberately precipitating dust, for example on start-up of an installation equipped with the flange couplings according to the invention.

The upper T-piece, shown in FIG. 1, and its lining 1a are constructed similarly to the lower length of pipe, with its lining 1b. Here again, the T-shaped lining 1a rests, by one of its ends, in a recess 9a of the refractory brick 4, whilst the other ends are supported in the cylindrical holes of the refractory bricks 5 and 6 by means of the glass wool or quartz wool stuffings which are not illustrated in the Figure.

The metal jackets 7 and 8 merge, at their ends, into flanges 11 and 12, which are bolted together in a conventional manner. The gasket 13 which can, for example, be made of rubber, is located between these two flanges. The feasibility of this arrangement is due to the fact that, in spite of heat bridges at the refractory bricks, the heat transfer is very slight and the two outer metallic jackets, for example made of steel, also remain relatively cold at the flanges and accordingly gaskets of a material which does not have particularly high heat resistance, such as rubber, can be employed.

The flange coupling depicted in FIG. 1 is a preferred embodiment of the invention, in which one or both ends of each individual section is or are supported by a recess 9a or 9b in the refractory brick. This embodiment ensures particularly reliable support of the lining, facilitates the centering of the lining and further improves the sealing of the interior of the lining from the space between the outer jacket and the lining. In principle it is however also possible to produce flange couplings without these recesses.

Figure 2:
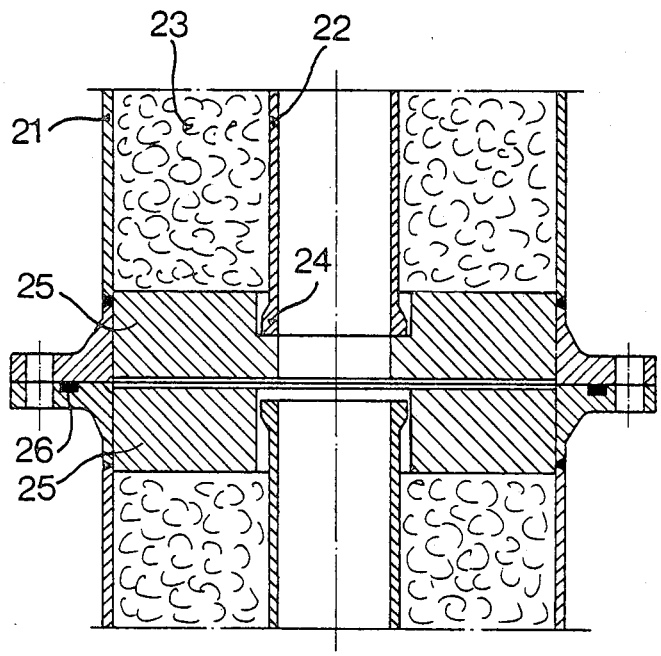
FIGS. 2 and 3 show two different embodiments of the flange coupling according to the invention, in vertical section.

FIG. 2 shows a larger-scale vertical section of a flange coupling according to the invention. 21 is the outer jacket of metallic material, 23 is the heat-insulating material and 22 is the lining made from glass resistant to thermal shock, for example borosilicate glass, or quartz. The ends of the lining are, in this case, thickened, for example constructed as a collar flange 24, which further stabilizes the hold of the lining. The refractory bricks 25 do not terminate quite flush with the surrounding metal jacket. This has the advantage that on assembling the flange there are no stresses due to possible unevenness of the surface of the bricks. The bricks are firmly cemented to the jacket by means of a suitable adhesive, for example a mixture of waterglass and finely ground fireclay. The seal is effected by an O-ring 26 set in an annular groove.

Figure 3:
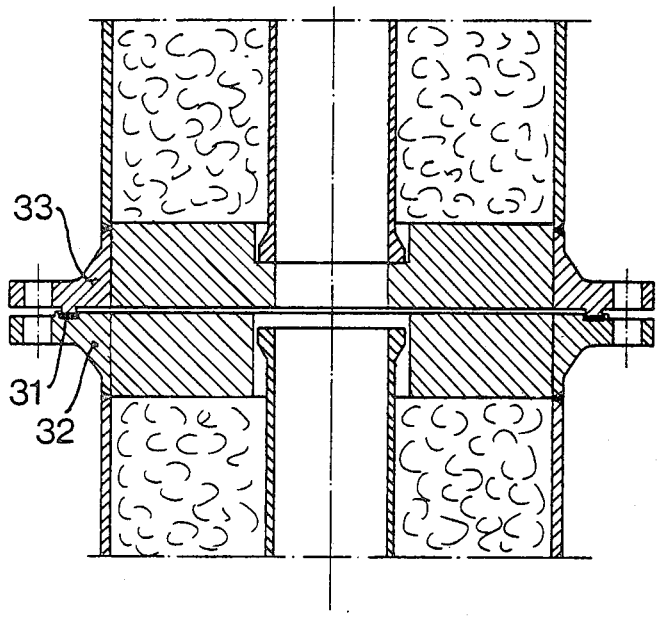

In FIG. 3, on the other hand, the seal is effected by a sealing ring 31 which is located in a groove set in the flange 32 and is compressed by a tongue present in the flange 33.

Figure 4:
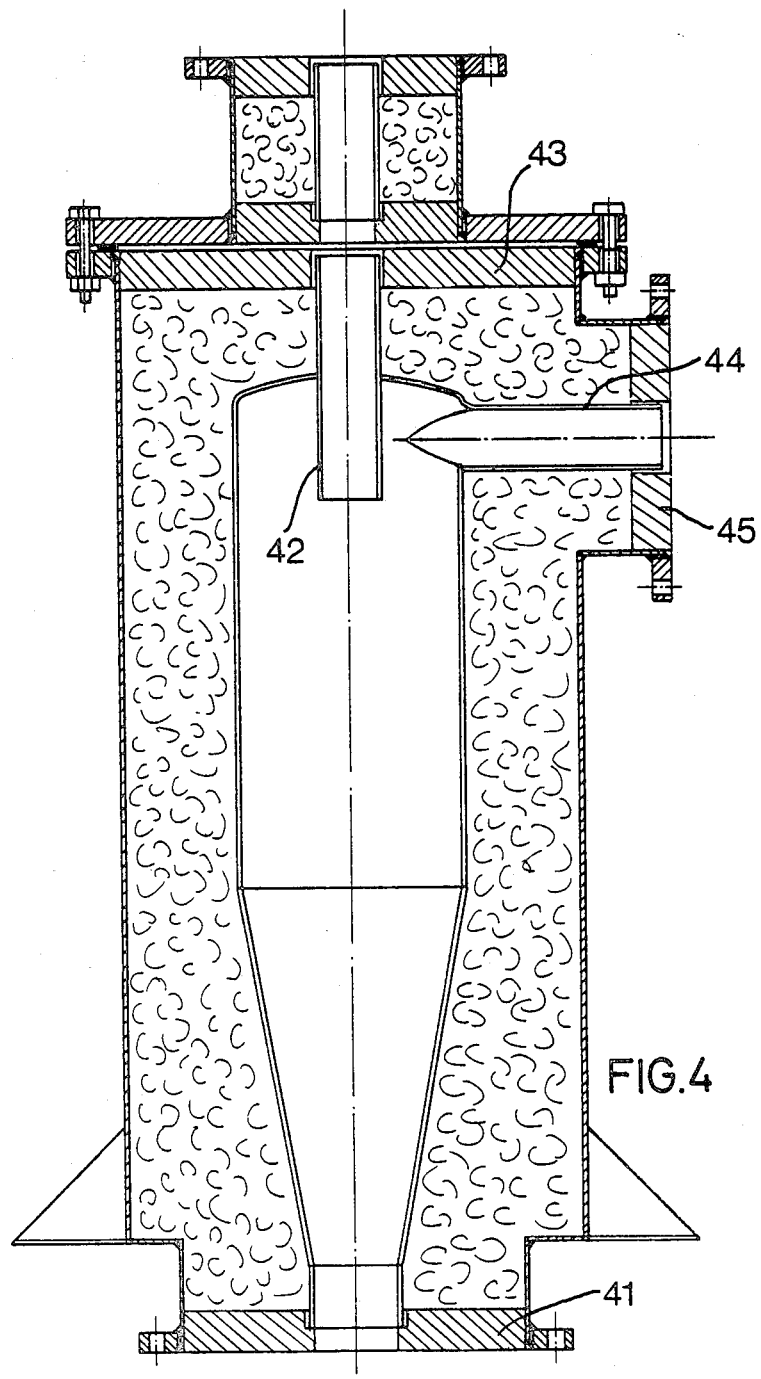
FIG. 4 shows, as an example of a part of an apparatus, a vertical section through a cyclone having the flange couplings according to the invention.

FIG. 4 depicts a cyclone equipped with the flange couplings according to the invention. Similarly to the arrangement depicted in FIG. 1, the cyclone is mounted, at one of its ends, in a refractory brick 41 provided with a recess, whilst at its other end it is supported in a cylindrical hole, surrounding the lining 42, of the brick 43, by means of a wool stuffing as described above. The upper edge of the lining 42 does not terminate flush with the upper edge of the brick 43, so that on increase of temperature the lining can expand freely along its lengthwise axis. The tangential outlet pipe 44 is mounted, similarly to the upper end of the cyclone, in the refractory brick 45, so that on expansion of the lining in the axial direction, the occurrence of stresses which could lead to fracture is prevented. The diameter of the hole of the brick 45 is such that both the radial expansion of the pipe 44 and the shift of the pipe 44 resulting from the longitudinal expansion of the cyclone can be accommodated.

The advantages achievable by means of the flange couplings according to the invention are in particular that installations made of glass or quartz and consisting of several individual sections can be coupled to one another in a leaktight manner without danger of fracture due to thermal expansion, even if gases which are substantially above 200° C. have to be handled in the individual sections of the pipe or apparatus. This novel technology for the first time makes it possible, for example, to employ apparatus made of glass for handling the gases present in the synthesis of aluminum chloride by reacting alumina or bauxite with chlorine in the presence of a reducing agent. As is well known, this reaction generates highly corrosive hot gases which cannot be handled in apparatus or pipelines made of metallic materials and have hitherto necessitated that each apparatus should have an inner wall lined with a ceramic material, even though this only has a limited life.

In contrast, using the flange couplings according to the invention it is possible to couple the individual pieces of apparatus and pipeline sections reliably to one another, in a leaktight manner, without running the risk of fracture of the inner lining, made of glass or quartz, by thermal expansion.

We claim:

1. A flange coupling structure for joining together the ends of multi-layer apparatus sections or pipeline sections, in which corrosive and hot gases are handled, each section consisting of an inner lining of glass which is resistant to thermal shock, or of quartz, said inner lining having at least two open ends and being surrounded by an outer metal jacket, the interspace between the outer jacket and the lining being packed with a heat-insulating material, said coupling comprising:
   (a) refractory bricks at the end portions of said lining between the lining and the outer jacket said bricks surrounding without touching the entire surface of the lining at said end portions thereof,
   (b) the lining, at one or both ends, does not terminate flush with the refractory bricks,
   (c) the refractory bricks surrounding the lining terminate at least substantially flush with the surrounding outer jacket, and (d) flange means at each end for coupling together the adjacent ends of the jackets of two adjacent sections of apparatus.

2. A flange coupling as claimed in claim 1, wherein the lining is supported, at one end, in a recess in the refractory brick.

3. A flange coupling as claimed in claim 1, including a gasket on at least one of said flange means.

4. In an improved apparatus component structure for handling and containing hot corrosive gases, which component is designed to be coupled at two or more ends to other apparatus components and includes an inner lining of corrosive and thermal shock resistant material, said lining having a lower end and an upper end, an outer metal jacket surrounding said lining between said ends and having outwardly extending flanges at each end for connection to other components, and heat insulating material packed between said lining and said jacket, the improvement comprising:

a first refractory brick at one end of said outer metal jacket slightly spaced and surrounding the lower end of said lining and extending to the interior of said jacket, said first refractory brick having a recess to support the said lower end of said lining and being open to the interior of said lining; and a second refractory brick at another end of said outer metal jacket having a hole to surround said lining and in which said upper end of said lining is positioned and may expand in a lengthwise direction toward a first refractory brick recess of a next apparatus component connected to a flange of said outer metal jacket.

5. The apparatus of claim 4, wherein the said first and second refractory bricks are substantially flush with the flanges of said jacket and the said lining is shorter than said jacket.

6. The apparatus of claim 4, wherein the spaces between said lining and surrounding refractory bricks are stuffed with insulation.

* * * * *